United States Patent
Dalgleish et al.

(10) Patent No.: US 7,050,758 B2
(45) Date of Patent: May 23, 2006

(54) SELF-CONFIGURING REPEATER SYSTEM AND METHOD

(75) Inventors: Robert Dalgleish, Richardson, TX (US); Mazin Al-Shalash, Plano, TX (US)

(73) Assignee: Nortel Networks Limited, St. Laurnet (CA)

( * ) Notice: Subject to any disclaimer, the term of this patent is extended or adjusted under 35 U.S.C. 154(b) by 418 days.

(21) Appl. No.: 10/086,581

(22) Filed: Feb. 28, 2002

(65) Prior Publication Data

US 2003/0211828 A1  Nov. 13, 2003

(51) Int. Cl.
*H04B 7/15* (2006.01)

(52) U.S. Cl. ............. 455/11.1; 455/41.1; 455/41.2; 455/41.3; 455/522; 375/315; 375/211; 370/315

(58) Field of Classification Search ............ 455/11.1, 455/41.3, 41.2, 41.1, 7, 522; 375/315, 211; 370/315
See application file for complete search history.

(56) References Cited

U.S. PATENT DOCUMENTS

| | | | |
|---|---|---|---|
| 5,634,191 A | | 5/1997 | Beasley |
| 5,802,452 A | * | 9/1998 | Grandfield et al. ........... 455/20 |
| 6,144,861 A | * | 11/2000 | Sundelin et al. ............ 455/522 |
| 6,157,812 A | * | 12/2000 | Sarraf ........................ 455/13.4 |
| 6,339,694 B1 | * | 1/2002 | Komara et al. ............ 455/11.1 |
| 6,469,984 B1 | * | 10/2002 | Baker ......................... 370/232 |
| 6,690,915 B1 | * | 2/2004 | Ito et al. ........................ 455/7 |

FOREIGN PATENT DOCUMENTS

| | | |
|---|---|---|
| WO | WO 99/26360 | 5/1999 |
| WO | WO 01/48947 | 7/2001 |
| WO | WO 01/50635 | 7/2001 |

\* cited by examiner

*Primary Examiner*—Nay Maung
*Assistant Examiner*—Shaima Q. Aminzay
(74) *Attorney, Agent, or Firm*—Haynes and Boone, LLP

(57) ABSTRACT

Provided is a system and method for a self-configuring repeater in a telecommunications network. The repeater receives data from a base transceiver station (BTS) via a downlink channel and sends data to the BTS via an uplink channel. The repeater compares the power level of a downlink signal (such as a pilot signal) to a reference power level. If the downlink signal's power level does not fall within a predetermined range relative to the reference power level, a comparator inside the repeater adjusts the received signal's power level by altering a gain of a downlink amplifier chain until the downlink signal's power level falls within the predetermined range. The comparator then applies the same gain to an uplink amplifier chain. In this way, the pilot signal's power level can be utilized to control the uplink noise level at the BTS.

18 Claims, 3 Drawing Sheets

SELF-CONFIGURING REPEATER SYSTEM AND METHOD

BACKGROUND OF THE INVENTION

The following disclosure relates generally to communications systems and, more particularly, to a self-configuring RF repeater in a telecommunications system.

A telecommunications system may provide communication services to a number of areas called "cells." Within a cell, a base transceiver station (BTS) may transmit data to a mobile device on a downlink channel using one frequency and receive data from the mobile device on an uplink channel using another frequency. Each mobile device may adjust the power at which it transmits (e.g., the strength of the mobile device's output signal) depending on its distance from the base station.

Certain telecommunications technologies, such as those based on code division multiple access (CDMA), require that mobile devices within a cell adjust their output power such that the signal strength received at the BTS is the same for all the mobile phones being serviced. Accordingly, to keep the signal strength equal at the BTS, mobile devices close to the BTS may use relatively low output power and mobile devices farther away may use an amount of output power that increases with distance. At the edge of the cell, the mobile devices may reach their maximum output power levels.

The increasing demand for high speed data services requires that telecommunications systems provide more bandwidth than may be needed for voice communications. Different ways to provide this bandwidth are available. For example, the power levels of the BTS and mobile devices may be increased. However, this may present health issues. Another way of providing the bandwidth is to bring the mobile devices closer to the BTS so that the existing power can be used in a smaller area. For wide area coverage, this solution may be expensive because it requires that additional cells be added to fill in gaps in the coverage area left by the smaller cells.

Another solution is to add "repeaters" that receive a radio frequency (RF) signal from a BTS and amplify the signal before sending it to a mobile device. A repeater may also amplify the signal from the mobile device before transmitting it to the BTS, enabling the mobile devices to use less power. The amount of amplification or "gain" of the repeater affects the efficiency of the repeater. If the gain is set too low, then the repeater is not covering as much area as possible and so is not being efficient. If the gain is too high, the repeater may generate noise and transmit the noise to the BTS. If the noise reaches a certain level, the noise may overwhelm signals being received by the BTS from other mobile devices not using the repeater, which reduces the effective size of the cell serviced by the BTS.

Accordingly, the gain of a repeater must be set so that it provides effective coverage but does not produce too much noise. Currently, the gain is set for each repeater by a technician. Because repeaters are used primarily for specialized applications, this is not difficult. However, due in part to the need for higher bandwidth in telecommunications systems, it may become expensive and time-consuming to manually optimize the gain of each repeater as repeaters are being deployed in far greater numbers.

Therefore, what is needed is a system and method for automatically setting the gain of an RF repeater in a telecommunications network.

SUMMARY OF THE INVENTION

In one embodiment, a method for automatically configuring a first and second gain of a repeater in a telecommunications system is provided. The telecommunications system utilizes the repeater to receive data from a transceiver via a downlink channel associated with the first gain and to send data to the transceiver via an uplink channel associated with the second gain. The method samples a power level of the downlink channel and compares the sampled power level to a reference power level. The first gain is adjusted so that the sampled power level is within a predetermined range of the reference power level and then the second gain is adjusted to equal the first gain. This enables a balance to be automatically achieved between a coverage area of the repeater and a level of noise associated with the uplink channel.

Other aspects and features of the present disclosure will become apparent to those ordinarily skilled in the art upon review of the following description of specific embodiments of the disclosure in conjunction with the accompanying figures.

DETAILED DESCRIPTION OF A PREFERRED EMBODIMENT

Figure 1:
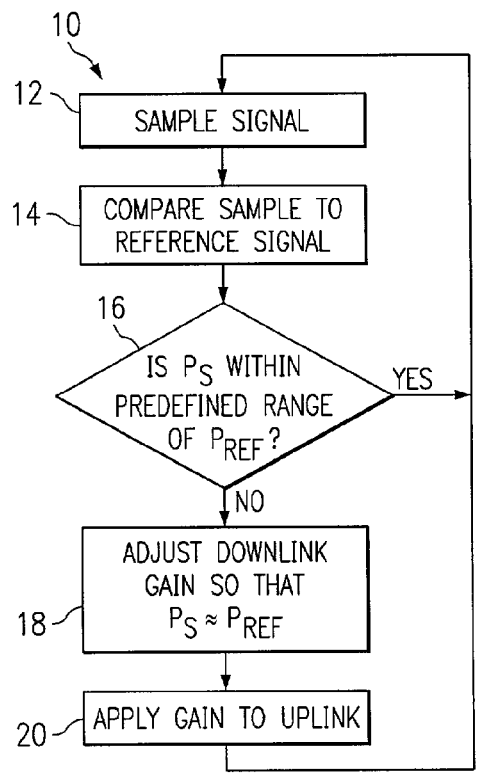
FIG. 1 is a flowchart of a method for self-configuring a level of gain for a downlink channel and an uplink channel in a repeater.

The present disclosure relates generally to communications systems and, more particularly, to a self-configuring RF repeater. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a method 10 is operable to automatically adjust the gain of a radio frequency (RF) repeater in a telecommunications system. As will be described later in greater detail using specific examples, the repeater may receive a signal from a base transceiver station (BTS) on a downlink channel, alter the gain of the signal if desired, and send the signal to a mobile device. Likewise, the repeater may receive a signal from the mobile device, alter the gain of the signal if desired, and send the signal to the BTS on an uplink channel.

The gain of the repeater may be balanced between a desired minimum signal strength and a desired maximum noise level. For example, the desired minimum signal strength may ensure that a signal provided by the repeater is strong enough to cover a desired area. Because increasing the gain may cause the repeater to amplify its own noise and send the noise back to the BTS, the maximum desired noise level may ensure that the noise generated by the repeater as the gain is increased does not negatively impact the BTS.

In step 12, the repeater samples the strength of a signal (e.g., the signal's power level) received from the BTS on the downlink channel. The sample power level ($P_s$) is compared to a reference power level ($P_{REF}$) in step 14. Based on the comparison, a determination is made in step 16 as to whether $P_s$ is within a predetermined range of $P_{REF}$. If yes, the method 10 may return to step 12 for another sample. If no, the gain of the downlink is altered in step 18 so that $P_s$ is within the predetermined range. For example, if $P_s$ is too strong, the repeater lowers the downlink gain (e.g., attenuates the downlink signal). If $P_s$ is too weak, the repeater increases the downlink gain (e.g., amplifies the downlink signal). Once the gain is adjusted, the repeater applies the same amount of gain to the uplink channel in step 18 and returns to step 12 to take another sample. Accordingly, the gain of the repeater is adapted to the signal strength of the BTS to maximize the coverage area of the repeater while minimizing the uplink noise at the BTS.

Figure 2:
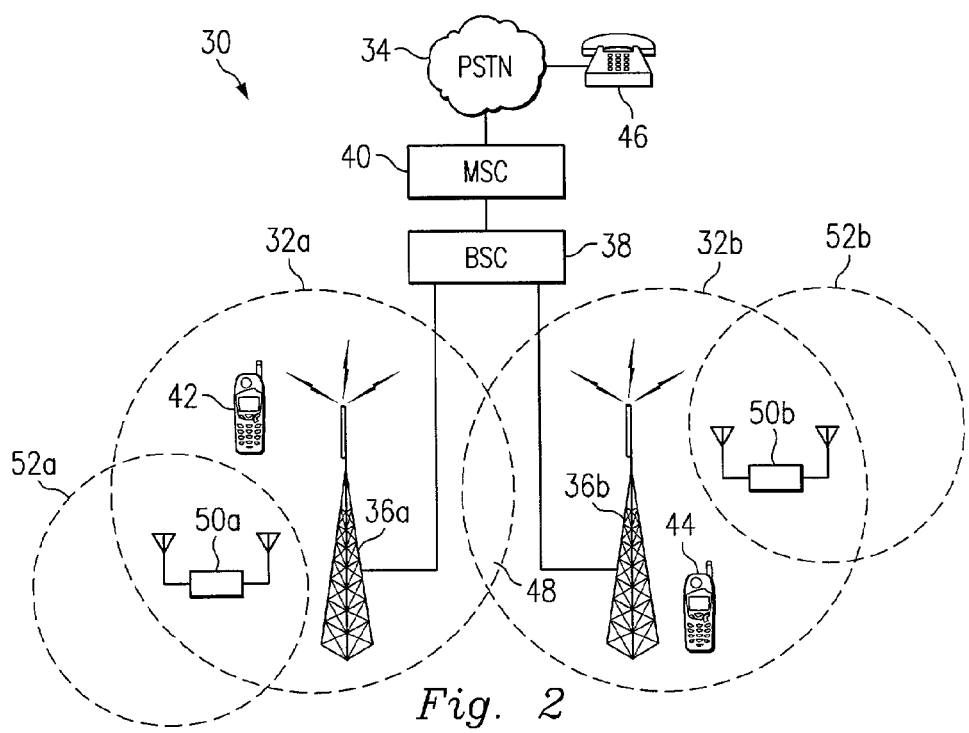
FIG. 2 is a diagram of an exemplary telecommunications network within which the self-configuration of a repeater may be practiced.

Referring now to FIG. 2, in another embodiment, a telecommunications network 30 illustrates a system in which the method described in reference to FIG. 1 may be practiced. The network 30 comprises a plurality of cells 32a, 32b, which, for purposes of clarity, are omni-cells (e.g., not sectorized). In general, a cell may contain more than one sector if the cell is not an omni-cell. For instance, a tri-sectored cell contains three sectors. The quality of service provided to each cell 32a, 32b may vary, depending on environmental conditions, traffic, construction, and similar factors. Accordingly, certain areas in each cell 32a, 32b may receive poor service or, in extreme conditions, no service (e.g., a coverage "hole").

In the present example, the network 30 is a wireless network, and may be connected to other wireless and/or wireline networks, such as a Public Switched Telephone Network (PSTN) 34. Each cell 32a, 32b in the network 30 includes a BTS 36a, 36b, respectively, which is connected to a base station controller (BSC) 38. A mobile switching center (MSC) 40 may be used to connect the network 30 with other networks such as the PSTN 34.

The network 30 enables at least one mobile device 42 to establish a communication session with another communication device 44 via the BTS 36a associated with the cell 32a in which the mobile device 42 is located. For example, a request to establish a voice communication session by the mobile device 42 may be directed by the MSC 40 to (1) the second mobile device 44 registered with the MSC 40 and within range of one of the BTSs 36a, 36b, (2) a voice terminal 46 coupled to the PSTN 34, or (3) a voice terminal (not shown) coupled elsewhere to the telecommunications network 30. If the communication session is a data transfer session, the request may be to connect the mobile device 42 to a computer or other data device via the network 30.

The cells 32a, 32b overlap so that the mobile device 42 may travel from one cell to another (e.g., from the cell 32a to the cell 32b) while maintaining a communication session. In a "handoff" region 48 (e.g., the area where the cells 32a, 32b overlap), the mobile device 42 may be serviced by both the BTS 36a and the ETS 36b.

Each BTS 36a, 36b transmits data to the respective mobile device 42, 44 via downlink channel and receives data from the mobile device via an uplink channel. Each BTS 36a, 36b transmits a constant power signal (a "pilot" signal) on the downlink channel. The pilot signal transmitted by each BTS 36a, 36b may be used by the mobile devices 42, 44 to determine the relative signal strength of each BTS 36a, 36b.

Each BTS 36a, 36b may also transmit power control information to the mobile devices 42, 44, respectively. The power control information aids in balancing resource usage with the quality of an established communication session. For example, if the quality of the communication session is poor, the BTS may send the mobile device a signal indicating that the mobile device should increase its output power. This may increase the quality of the communication session by increasing the signal strength at the BTS, but will deplete the mobile device's energy supply more quickly (assuming that the mobile device is powered by a battery or other limited energy source).

If the signal level of the communication session is too high, the BTS may send the mobile device a signal indicating that the mobile device should decrease its output power. This may decrease the quality of the communication session, but the decrease may not be noticeable. For example, if a frame erasure rate of two percent (e.g., two percent of the voice frames for the communication session are dropped) is acceptable, then the BTS may control the mobile device's output power so that approximately two percent of the frames are lost. This provides an acceptable quality of service for the communication session while conserving power.

To extend the coverage area of the cells 32a, 32b or to fill in coverage holes, repeaters 50a, 50b may be positioned within the cells 32a, 32b and associated with the "donor" BTSs 36a, 36b, respectively. In the present embodiment, the operation of the BTSs 36a, 36b may not account for the presence of the repeaters 50a, 50b (e.g., the BTSs 36a, 36b may not be "aware" of the repeaters 50a, 50b). As stated previously, the repeaters 50a, 50b operate by receiving signals from the associated BTSs 36a, 36b on downlink channels, altering the signals (e.g., amplifying or attenuating the signals), and sending the signals on to mobile devices. Likewise, the repeaters 50a, 50b may receive signals from mobile devices, alter the signals, and send the signals on to BTSs 36a, 36b via uplink channels. When in operation, each repeater 50a, 50b may have a coverage area 52a, 52b, respectively. Accordingly, without altering the behavior of the BTSs 36a, 36b, the repeaters 50a, 50b may provide telecommunications services to mobile devices within the coverage areas 52a, 52b.

Figure 3:
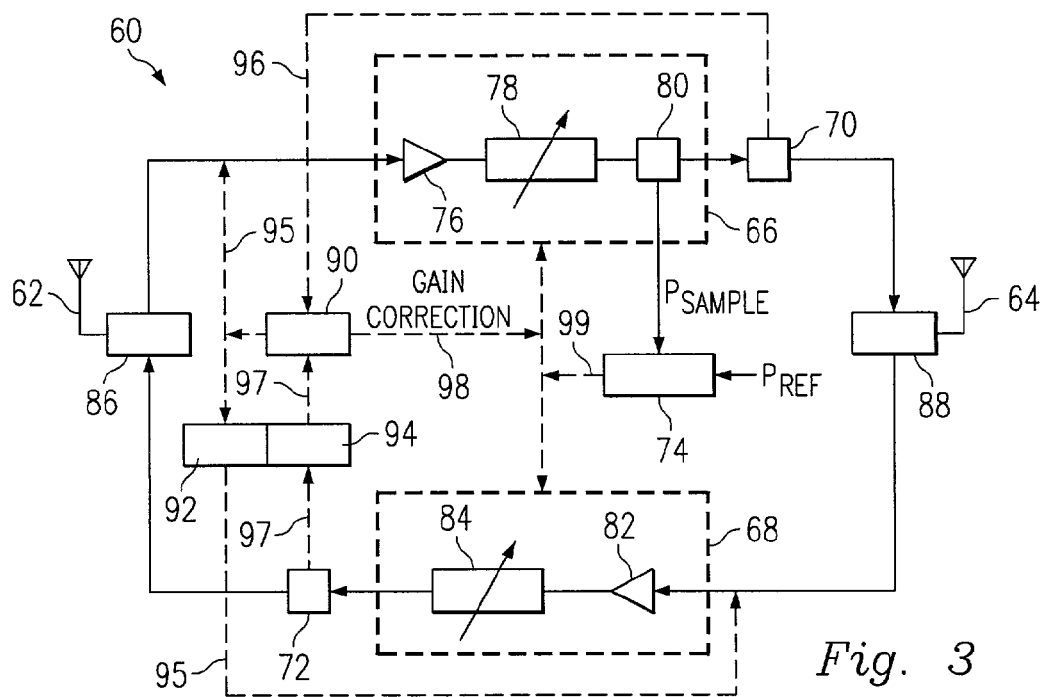
FIG. 3 is a block diagram of an exemplary repeater that may be utilized in the network of FIG. 2 to execute the method of FIG. 1.

Referring now to FIG. 3, in another embodiment, a repeater 60 includes a first antenna 62, a second antenna 64, a downlink amplifier chain 66, an uplink amplifier chain 68, a first switch 70, a second switch 72, and a comparator 74. The downlink amplifier chain 66 includes an amplifier 76, a variable attenuator 78, and a test point 80. The uplink amplifier chain 68 includes an amplifier 82 and a variable attenuator 84. Two diplexers 86, 88 may be utilized to separate the downlink and uplink signals at the first and second antennas 62, 64, respectively. It is understood that certain components may be combined or altered if desired. For example, the diplexers 86, 88 may be included in the amplifier chains 66, 68. Furthermore, the amplifiers 76, 82 may be variable.

In the present example, the repeater 60 includes a gain balancer 90 to equalize the gain G1 of the downlink amplifier chain 66 and the gain G2 of the uplink amplifier chain 68. Because the downlink and uplink channels may use different frequencies, the gain balancer 90 may use a downlink converter 92 and an uplink converter 94 to convert one of the frequencies for comparison.

In operation, in order for the repeater 60 to balance the downlink gain G1 and uplink gain G2, an initialization process may be utilized to ensure that the initial gains are approximately equal. To accomplish equality, the gain balancer 90 may emit a low signal at the frequency of the downlink channel. The signal may be simultaneously transmitted to the downlink amplifier chain 66 (the downlink initialization signal) and to the uplink amplifier chain 68 (the uplink initialization signal) as indicated by arrow 95. Because the uplink channel utilizes a different frequency than the downlink channel, the uplink initialization signal going to the uplink amplifier chain 68 first passes through the downlink converter 92, which converts the uplink initialization signal from the downlink frequency to the uplink frequency.

The downlink and uplink initialization signals pass through the amplifier chains 66, 68, respectively, before arriving at the switches 70, 72. The switches 70, 72 serve to prevent the downlink and uplink initialization signals from reaching the antennas 62, 64, and instead divert the signals back to the gain balancer 90 as indicated by arrows 96, 97. Before reaching the gain balancer 90, the uplink initialization signal passes through the uplink converter 94, which converts the signal from the uplink frequency to the downlink frequency.

The downlink and uplink initialization signals may then be compared by the gain balancer 90. If the signals are not balanced (e.g., their power levels do not fall within some desired range), then the gain balancer 90 may alter the gains G1 and/or G2 of the downlink and uplink amplifier chains 66, 68 (indicated by arrow 98) to balance the downlink and uplink initialization signals. After the gain is altered, the initialization process may continue by comparing the downlink and uplink initialization signals. This process may continue until a desirable balance between the downlink and uplink initialization signals is achieved. This balancing process may occur when the repeater 60 is powered on, at desired intervals, or according to some other specified criteria.

After the initialization process is complete, the antenna 62 may receive a number of signals from a BTS via a downlink channel. The signals are diverted by the diplexer 86 to the downlink amplifier chain 66. As previously described, one of the downlink signals may be a pilot signal, which is a constant power signal used by a mobile device to determine the relative signal strength of the base station.

The pilot signal passes through the amplification chain (where the signal strength may be adjusted) and arrives at the test point 70. The test point 70 samples the pilot signal strength and passes the sample $P_s$ to the comparator 74, which compares $P_s$ to a reference power level $P_{REF}$. The comparison process will be described later in greater detail in reference to FIG. 4, and so will be summarized for purposes of clarity in discussing FIG. 3.

The comparator 74 may alter the gain G1 in the downlink amplifier chain 66 to bring $P_s$ to within a certain margin of $P_{REF}$ (as indicated by arrow 99). For example, the comparator 74 may alter the setting of the variable attenuator 78. Once the gain G1 of the downlink amplifier chain 66 is adjusted such that $P_s$ reaches the desired range, the comparator 74 applies the gain G1 to the uplink amplifier chain 68 (e.g., G2 is set equal to G1). Accordingly, $P_{REF}$ can be selected based on an acceptable uplink channel noise level.

Other downlink channel signals may then be scaled in relation to the power signal, as they will pass through the downlink amplifier chain 66 and be subject to the associated gain G1. For example, if the BTS transmits a pilot signal at two watts and traffic (e.g., data) signals at 100–1000 milliwatts (mW), then a reference signal of approximately 200 mW will result in the repeater transmitting a pilot signal of approximately 200 mW and traffic signals of 1–100 mW.

Figure 4:
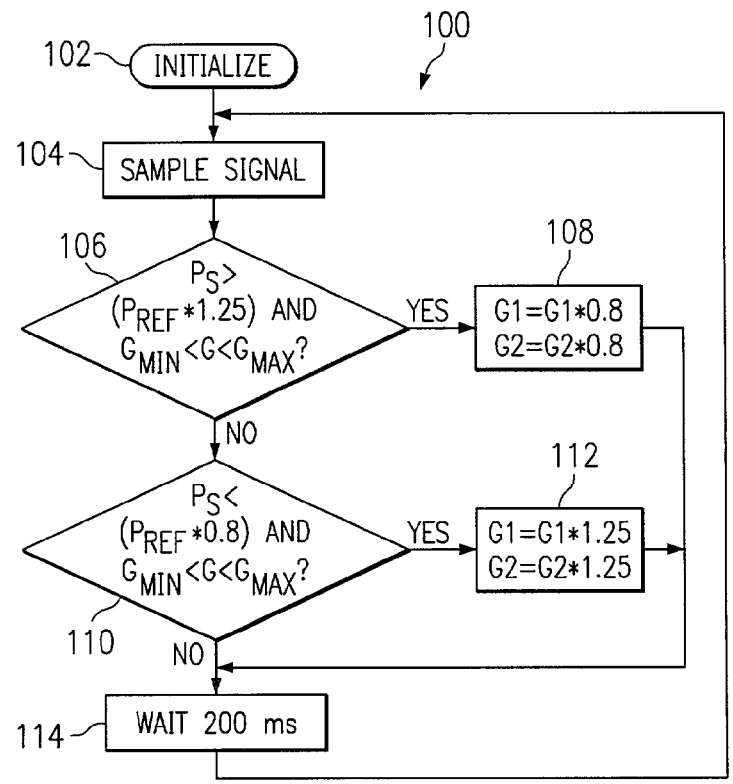
FIG. 4 is a flowchart illustrating the method of FIG. 1 in greater detail.

Referring now to FIG. 4, in another embodiment, a method 100 is operable to adaptively adjust the gains G1 and G2 of the downlink and uplink amplifier chains in a repeater, such as the repeater 60 of FIG. 3. The method may begin with an initialization step 102, which will be described in greater detail in reference to FIG. 5. In step 104, a power level sample $P_s$ is taken of the pilot signal from the downlink channel. In step 106, $P_s$ is compared to a predetermined reference power level $P_{REF}$. For purposes of illustration, $P_s$ is to be within a range with a maximum value of $P_{REF}*1.25$ and a minimum value of $P_{REF}*0.8$. In addition, a minimum level of gain $G_{MIN}$ and maximum level of gain $G_{MAX}$ may be established. For example, $G_{MIN}$ may represent the highest level of attenuation possible without damaging the repeater 60. Likewise, $G_{MAX}$ may represent the highest level of amplification possible without damaging the repeater 60. It is understood that $G_{MIN}$ and $G_{MAX}$ may vary according to the particular repeater structure and may represent "safe" levels that are less than the actual defined maximum limits of the repeater 60.

If it is determined in step 106 that $P_s>(P_{REF}*1.25)$ and that the current gain G1 is between $G_{MIN}$ and $G_{MAX}$, then $P_s$ is too high. This indicates that the uplink noise from the repeater to the donor BTS is higher than desired, and that the performance of the BTS may be adversely effected. Accordingly, the method 100 continues to step 108, where G1 and G2 are multiplied by 0.8 (e.g., the gain G1 of the downlink amplifier chain is reduced and then the same reduction is made to the gain G2 of the uplink amplifier chain). The method 100 then continues to step 114, where it waits for a predetermined amount of time (e.g., 200 ms) before obtaining another sample $P_s$.

If it is determined in step 106 that $P_s$ is not greater than $(P_{REF}*1.25)$ or that the current gain G1 is not between $G_{MIN}$ and $G_{MAX}$, then $P_s$ is not too high. The method 100 then continues to step 110, where it determines whether $P_s<(P_{REF}*0.8)$ and the current gain G1 is between $G_{MIN}$ and $G_{MAX}$. If yes, then $P_s$ is too low, which indicates that the repeater is not servicing a large enough coverage area. Accordingly, the method 100 continues to step 112, where G1 and G2 are multiplied by 1.25 (e.g., the gain G1 of the downlink amplifier chain is increased and then the same increase is made to the gain G2 of the uplink amplifier chain). The method 100 then continues to step 114, where it waits for a predetermined amount of time (e.g., 200 ms) before obtaining another sample $P_s$.

If it is determined in step 110 that $P_s$ is not less than $(P_{REF}*0.8)$ or that the current gain G1 is not between $G_{MIN}$ and $G_{MAX}$, then $P_s$ is not too low. The method 100 then proceeds to step 114 and waits for the predetermined amount of time before returning to step 104 and taking another sample.

Accordingly, the repeater can configure itself by incrementing the gains G1 and G2 until a desired balance between coverage area and noise is achieved. In this manner, a relationship between the pilot power and the uplink noise level at the BTS may be utilized to self-configure the repeater.

Figure 5:
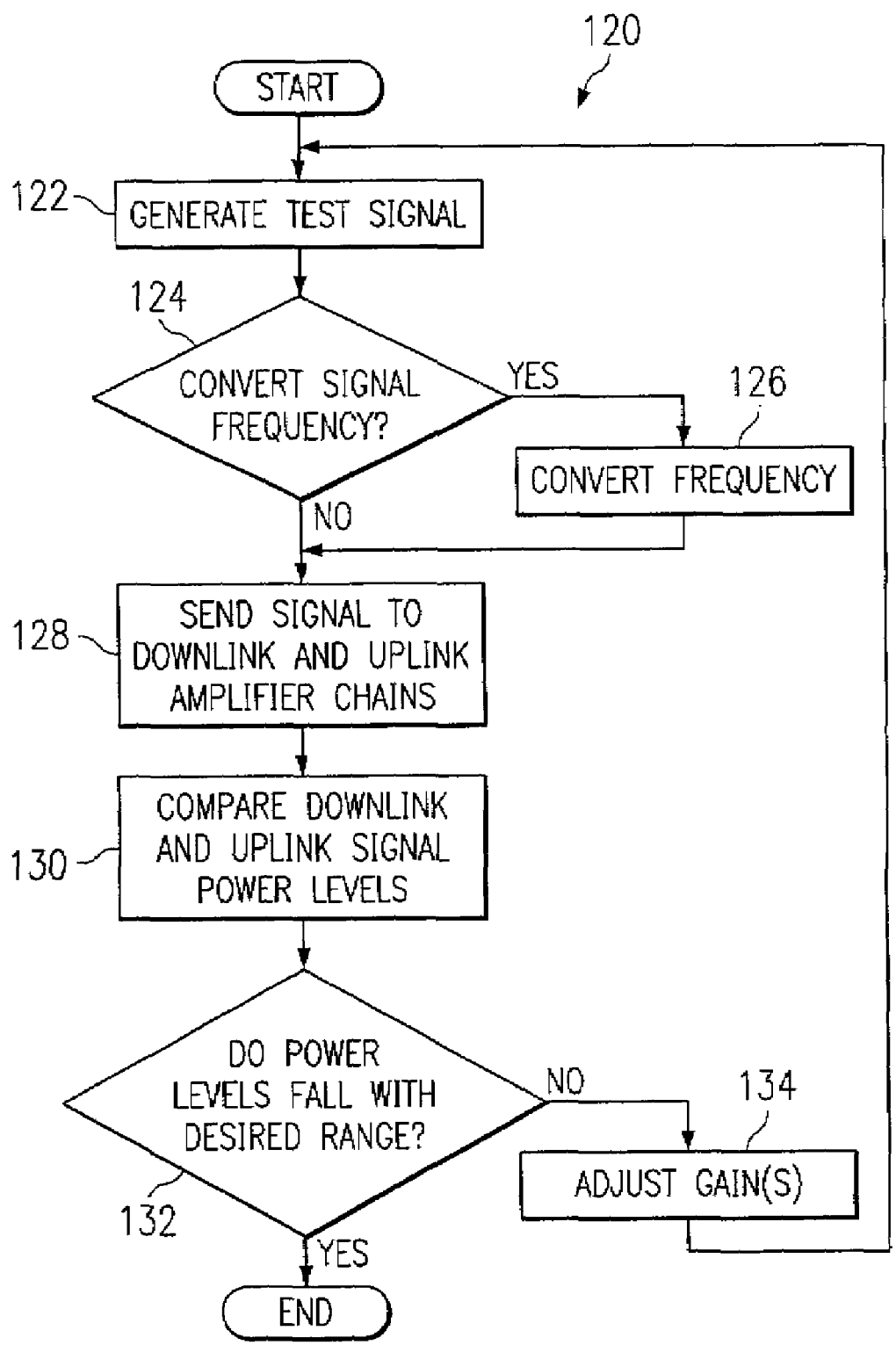
FIG. 5 is a flowchart illustrating a balancing process that may occur in the method of FIG. 4.

Referring now to FIG. 5, a method 120 may be executed during the initialization process in step 102 of FIG. 4. The method 120 begins in step 122 with the generation of a test signal that is to be passed to a downlink and an uplink amplifier chain. Due to frequency differences in the amplifier chains, a determination may be made in step 124 as to whether the signal needs to be converted before being transferred to one or both of the amplifier chains. If yes, the signal is converted in step 126 before being sent to the amplifier chains in step 128.

In step 130, the gains of the uplink and downlink amplifier chains are compared by determining the difference in the power levels of the signals. If the signals fall within a desired range relative to each other (e.g., if the signals are relatively equal in strength) as determined in step 132, the method 120 ends. However, if the signals do not fall within the desired range, then one or both of the gains of the amplifier chains are adjusted in step 134, and the method 120 returns to step 122.

While the preceding description shows and describes one or more embodiments, it will be understood by those skilled in the art that various changes in form and detail may be made therein without departing from the spirit and scope of the present disclosure. For example, it is within the scope of the present disclosure that the BTS, the repeater, and/or the mobile device may not exist in the same fashion in other technologies or implementations, but the same functionality may be achieved using other components. In addition, other methods of obtaining or calculating the strength of a downlink signal may be utilized in developing a desired solution. Furthermore, balancing the respective gains of the downlink and uplink amplifier chains may be accomplished using a number of steps or approaches that are different from those described above. Therefore, the claims should be interpreted in a broad manner, consistent with the present disclosure.

What is claimed is:

1. A method for automatically configuring a first gain and a second gain of a repeater in a telecommunications system, the repeater operable to receive data from a transceiver via a downlink channel associated with the first gain and to send data to the transceiver via an uplink channel associated with the second gain, the method comprising:
    sampling a power level of the downlink channel;
    comparing the sampled power level to a reference power level;
    adjusting the first gain so that the sampled power level is within a predetermined range of the reference power level; and
    automatically applying the first gain's adjustment to the second gain to adjust the second gain to equal the first gain without comparing the second gain to the sampled power level, so that a balance can be automatically achieved between a coverage area of the repeater and a level of noise associated with the uplink channel.

2. The method of claim 1 further including selecting the reference power level to control the level of noise associated with the uplink channel.

3. The method of claim 1 wherein the sampled power level is the power level of a pilot signal.

4. The method of claim 3 further including demodulating the pilot signal.

5. The method of claim 1 further including:
    comparing an initial downlink channel gain with an initial uplink channel gain; and
    altering at least one of the initial gains, so that the initial gains fall within a predetermined range relative to one another.

6. The method of claim 5 wherein the downlink channel uses a first frequency and the uplink channel uses a second frequency.

7. The method of claim 6 further including converting either the first frequency into the second frequency or the second frequency into the first frequency so that the first and second frequencies can be compared.

8. The method of claim 1 further including comparing the first gain to a minimum repeater gain and a maximum repeater gain to determine whether the first gain is greater than the minimum repeater gain and less than the maximum repeater gain, the comparison ensuring that the repeater is capable of supporting the first gain.

9. The method of claim 1 further including scaling a plurality of other signals on the downlink channel with the first gain.

10. The method of claim 1 further including defining an upper and lower limit associated with the first gain, so that the second gain is considered equal to the first gain if the second gain is within the upper and lower limits.

11. A method for automatically adjusting a first gain and a second gain in a repeater, the repeater operable to communicate with a transceiver in a telecommunications system via a downlink channel associated with the first gain and an uplink channel associated with the second gain, the method comprising:
    producing an initialization signal within the repeater;
    applying the first and second gains to the initialization signal;
    equalizing the first and second gains if the first and second gains are not equalized;
    receiving a signal from the transceiver via the downlink channel after equalizing the first and second gains;
    sampling the received signal to obtain a power level;
    comparing the sampled power level to a reference power level to determine whether the sampled power level falls within a predefined range of the reference power level;
    incrementally adjusting the first gain so that the sampled power level is within the predetermined range; and
    adjusting the second gain so that the second gain is within a predefined range of the first gain.

12. The method of claim 11 further including selecting the reference power level so that a level of noise associated with the uplink channel remains below a predetermined maximum noise level.

13. The method of claim 11 further including comparing the first gain to a maximum gain and a minimum gain, wherein the maximum and minimum gains define upper and lower device limitations of the repeater, respectively.

14. The method of claim 11 wherein the reference signal is selected to optimize a maximum coverage area of the repeater without degrading a coverage area of the transceiver.

15. A self-configuring repeater for use in a telecommunications network, the repeater operable to receive data from a base station via a downlink channel and to send data to the base station via an uplink channel, the repeater comprising:
    a first amplifier chain operable to apply a first gain to a first signal received via the downlink channel;
    a second amplifier chain operable to apply a second gain to a second signal to be sent via the uplink channel;
    a gain balancer configured to equalize the first and second gains prior to receiving the first signal; and
    a comparator accessible to the first and second amplifier chains, the comparator operable to compare a power level of the first signal to a reference power level, adjust the first gain so that the power level of the first signal falls within a predetermined range of the reference power level, and adjust the second gain to equal the first gain.

16. The repeater of claim 15 further including:
a first and second antenna;
a first switch positioned between the first amplifier chain and the first antenna;
and a second switch positioned between the second amplifier chain and the second antenna, the first and second switches operable to prevent a balancing signal generated by the gain balancer from being transmitted via the first and second antennas.

17. The repeater of claim 15 wherein the first amplifier chain includes at least a first amplifier, a first attenuator, and a test point and wherein the second amplifier chain includes at least a second amplifier and a second attenuator.

18. The repeater of claim 15 wherein the comparator is further operable to demodulate the first signal.

* * * * *

UNITED STATES PATENT AND TRADEMARK OFFICE
CERTIFICATE OF CORRECTION

| | |
|---|---|
| PATENT NO. | : 7,050,758 B2 |
| APPLICATION NO. | : 10/086581 |
| DATED | : May 23, 2006 |
| INVENTOR(S) | : Dalgleish et al. |

It is certified that error appears in the above-identified patent and that said Letters Patent is hereby corrected as shown below:

Column 3, Line 64, "ETS" should read as -- BTS --.

Signed and Sealed this

Twenty-seventh Day of March, 2007

JON W. DUDAS
*Director of the United States Patent and Trademark Office*